United States Patent
Kim et al.

(10) Patent No.: US 12,549,251 B2
(45) Date of Patent: Feb. 10, 2026

(54) OPTICAL LINK POWER PROFILE ESTIMATION

(71) Applicant: 1FINITY Inc., Kawasaki (JP)

(72) Inventors: Inwoong Kim, Richardson, TX (US); Olga I. Vassilieva, Richardson, TX (US); Ryu Shinzaki, Kawasaki (JP); Motohiko Eto, Richardson, TX (US); Shoichiro Oda, Kawasaki (JP); Paparao Palacharla, Richardson, TX (US)

(73) Assignee: 1FINITY Inc., Kawasaki (JP)

( * ) Notice: Subject to any disclaimer, the term of this patent is extended or adjusted under 35 U.S.C. 154(b) by 180 days.

(21) Appl. No.: 18/447,288

(22) Filed: Aug. 9, 2023

(65) Prior Publication Data

US 2024/0137119 A1  Apr. 25, 2024

Related U.S. Application Data

(60) Provisional application No. 63/379,888, filed on Oct. 17, 2022.

(51) Int. Cl.
H04B 10/079 (2013.01)
H04B 10/60 (2013.01)

(52) U.S. Cl.
CPC ....... *H04B 10/07955* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 5,410,515 | A * | 4/1995 | Bielas | G01C 19/721 372/28 |
| 6,025,915 | A * | 2/2000 | Michal | H01S 3/06795 356/460 |
| 10,432,536 | B1 * | 10/2019 | Subramanian | H04L 47/805 |
| 2013/0135623 | A1 * | 5/2013 | Yang | G01C 19/72 356/463 |

(Continued)

OTHER PUBLICATIONS

T. Tanimura, "Experimental Demonstration of a Coherent Receiver that Visualizes Longitudinal Signal Power Profile over Multiple Spans out of Its Incoming Signal", ECOC Sep. 2019.

(Continued)

*Primary Examiner* — Darren E Wolf
(74) *Attorney, Agent, or Firm* — Maschoff Brennan

(57) ABSTRACT

According to an aspect of an embodiment, operations may include obtaining a first waveform profile corresponding to an optical signal received at an optical receiver via an optical link between the optical receiver and an optical transmitter. The operations may also include obtaining a second waveform profile that is an estimate of the first waveform profile. The second waveform profile may be based on one or more properties of the optical link and may be based on a complex scaling factor that accounts for rotation of the optical signal as the optical signal propagates via the optical link. In addition, the operations may include determining a power profile estimation corresponding to the optical link based on a comparison between the first waveform profile and the second waveform profile.

20 Claims, 5 Drawing Sheets

(56) References Cited

U.S. PATENT DOCUMENTS

2018/0274926 A1* 9/2018 Wang ................... G01C 19/72
2019/0147202 A1* 5/2019 Harney ............... H04L 41/0809
　　　　　　　　　　　　　　　　　　　　　235/375

OTHER PUBLICATIONS

T. Sasai, "Simultaneous Detection of Anomaly Points and Fiber types in Multi-span Transmission Links Only by Receiver-side Digital Signal Processing", OFC Mar. 2020.
S. Gleb, "Fiber Link Anomaly Detection and Estimation Based on Signal Nonlinearity", ECOC Nov. 2021.
T. Sasai, "Proposal of Linear Least Squares for Fiber-Nonlinearity-Based Longitudinal Power Monitoring in Multi-Span Link", OECC Aug. 2022.
T. Sasai, "Digital Longitudinal Monitoring of Optical Fiber Communication Link", Journal of Lightwave Technology, vol. 40, No. 8, Apr. 15, 2022.

* cited by examiner

OPTICAL LINK POWER PROFILE ESTIMATION

CROSS-REFERENCE TO RELATED APPLICATION

This patent application claims the benefit of and priority to U.S. Provisional App. No. US 63/379,888 filed Oct. 17, 2022 which is incorporated in the present disclosure by reference in its entirety.

FIELD

The embodiments discussed herein are related to power profile estimation corresponding to optical links.

BACKGROUND

Telecommunications systems, cable television systems and data communication networks use optical networks to convey information between remote points. In an optical network, information is conveyed in the form of optical signals through optical fibers or other optical media. The optical networks may include various components such as amplifiers, dispersion compensators, multiplexer/demultiplexer filters, wavelength selective switches, couplers, etc. configured to perform various operations within the optical network.

In some instances, the power of optical signals can vary along the length of communication links (e.g., along the length of optical fibers) due to various factors such as attenuation, dispersion, and nonlinear effects. Estimating a power profile corresponding to such links accurately may be helpful for system design, optimization, and performance evaluation.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include obtaining a first waveform profile corresponding to an optical signal received at an optical receiver via an optical link between the optical receiver and an optical transmitter. The operations may also include obtaining a second waveform profile that is an estimate of the first waveform profile. The second waveform profile may be based on one or more properties of the optical link and may be based on a complex scaling factor that accounts for rotation of the optical signal as the optical signal propagates via the optical link. In addition, the operations may include determining a power profile estimation corresponding to the optical link based on a comparison between the first waveform profile and the second waveform profile.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
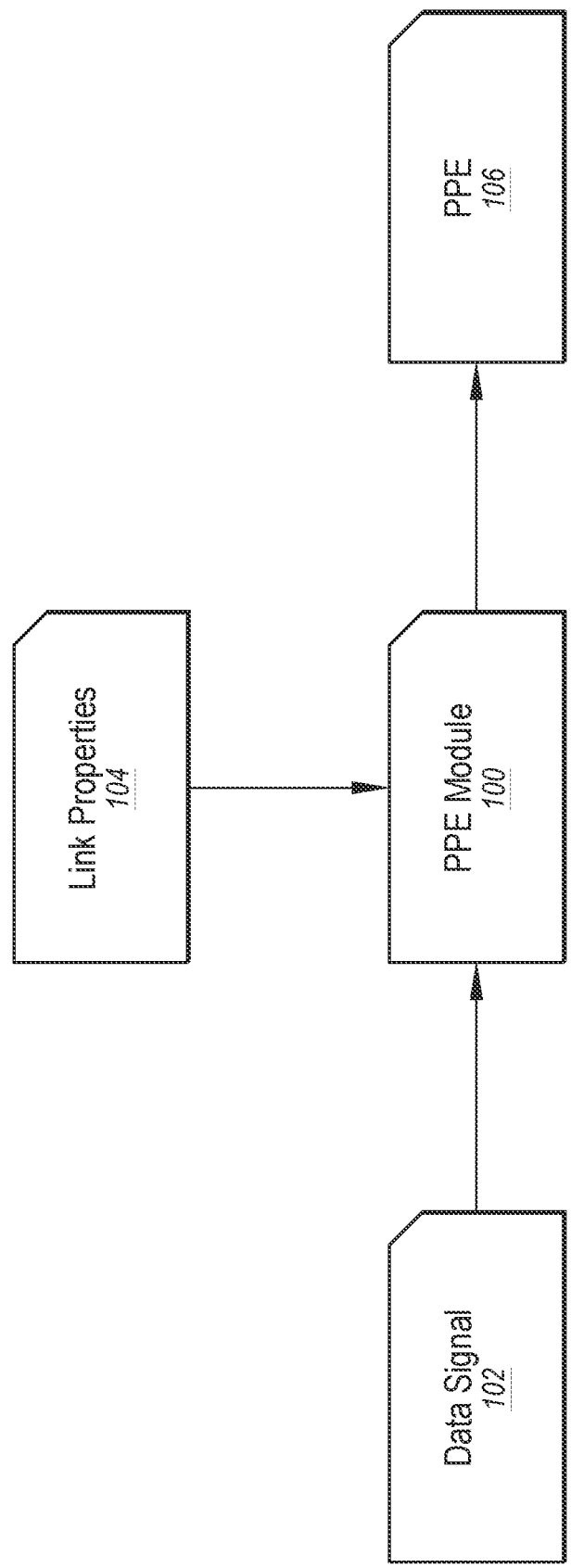
FIG. 1A illustrates an example embodiment of a power profile estimation module configured to estimate a power profile corresponding to an optical link.

Optical systems may include nodes that may be configured to communicate information to each other via optical signals that are propagated through optical links (e.g., optical fibers The power distribution of optical signals as they propagate in an optical fiber may be influenced by several factors, including attenuation, dispersion, nonlinearities, and other impairments. Longitudinal power profile estimation (PPE) may be used to determine an estimate of the power levels at different positions along the fiber. In some embodiments, PPE may be used to analyze the signal degradation and improve system performance.

Some techniques of determining PPE may include comparing a received waveform profile of an optical signal received at an optical receiver with an emulated waveform profile for the optical signal. Generating or determining emulated waveform profiles may include simulating the behavior of optical signals as they propagate through the fiber, taking into account the physical characteristics of the fiber and the properties of the signals themselves. This simulation may incorporate mathematical models that describe the effects of attenuation, dispersion, and nonlinearities. Further, one or more PPE techniques may include a Minimum Mean Square Error (MMSE) technique that may estimate the power profile by minimizing a mean square error corresponding to a comparison between the received waveform profile and the emulated waveform profile.

According to one or more embodiments of the present disclosure, an MMSE technique for determining PPE may include using a complex scaling factor in the determining of the emulated waveform profile. The complex scaling factor may include a complex number (e.g., may include an imaginary number component to it) that may account for rotation (e.g., as caused by one or more non-linearities) of the corresponding received optical signal that may occur as the optical signal propagates between the optical transmitter and the optical receiver. Additionally or alternatively, the complex scaling factor may help account for potential scaling errors that may occur in the generation of the emulated waveform profile.

Such use of the complex scaling factor may result in the PPE being more accurate than with other PPE techniques. For example, the rotation of the optical signal may be removed during carrier phase estimation that may be performed with respect to the received optical signal prior to performing PPE. As such, the PPE of the optical link may not reflect some nonlinear properties (e.g., that cause rotation) of the optical link in PPE techniques in which the rotation is not accounted for. Some other PPE techniques may include estimating the rotation that is removed, but such estimations may result in a less accurate PPE determination than use of the complex scaling factor to account for rotation as discussed in the present disclosure.

Embodiments of the present disclosure will be explained with reference to the accompanying drawings.

FIG. 1A illustrates an example embodiment of a longitudinal power profile (PPE) module 100 ("PPE module 100") configured to determine a PPE 106 corresponding to an optical link based on a data signal 102 and one or more link properties 104 associated with the optical link, arranged in accordance with at least some embodiments of the present disclosure. The PPE module 100 may be included in any suitable optical device. For example, the PPE module 100 may be included in any suitable optical receiver configured to receive an optical signal via an optical link. In some embodiments, the optical receiver may be any suitable coherent optical receiver.

The data signal 102 may be a data signal corresponding to an optical signal that may be received at an optical receiver. For example, in some embodiments the data signal 102 may include an electrical signal that has been generated based on an optical to electrical conversion of the optical signal.

Additionally or alternatively, the data signal 102 may include multiple signals that correspond to the optical signal. For example, the optical signal may be generated using any suitable modulation scheme such as any suitable polarization multiplexed or dual-polarization modulation scheme. For instance, the optical signal may be generated using a dual-polarization (DP) modulation scheme that may include a dual-polarization quadrature phase-shift keying (DP-QPSK) modulation scheme, a DP-8PSK modulation scheme, a DP-16PSK modulation scheme, or any applicable dual-polarization quadrature amplitude modulation (DP-QAM) scheme (e.g., DP-QAM, DP-8QAM, DP-16QAM, etc.).

In these and other embodiments, the data signal 102 may include one or more symbols corresponding to the optical signal. Additionally or alternatively, each symbol may be encoded as a different combination of amplitude and phase of a carrier signal to represent one or more bits of information.

For example, in instances in which DP-QPSK modulation is used to generate the optical signal, the data signal 102 may include a first symbol representing first data and that corresponds to an in-phase horizontal polarization component (HI) of the optical signal, a second symbol representing second data and that corresponds to a quadrature-phase horizontal polarization component (HQ) of the optical signal, a third symbol representing third data and that corresponds to an in-phase vertical polarization component (VI) of the optical signal, and a fourth symbol representing fourth data and that corresponds to a quadrature-phase vertical polarization component (VQ) of the optical signal.

In some embodiments, the data signal 102 may have had one or more signal processing operations performed thereon. For example, the data signal 102 may have had chromatic dispersion compensation performed thereon. The chromatic dispersion compensation may clean up noise in the corresponding optical signal that may have been caused by chromatic dispersion caused by the optical link as the corresponding optical signal propagated through the optical link.

Figure 1B:
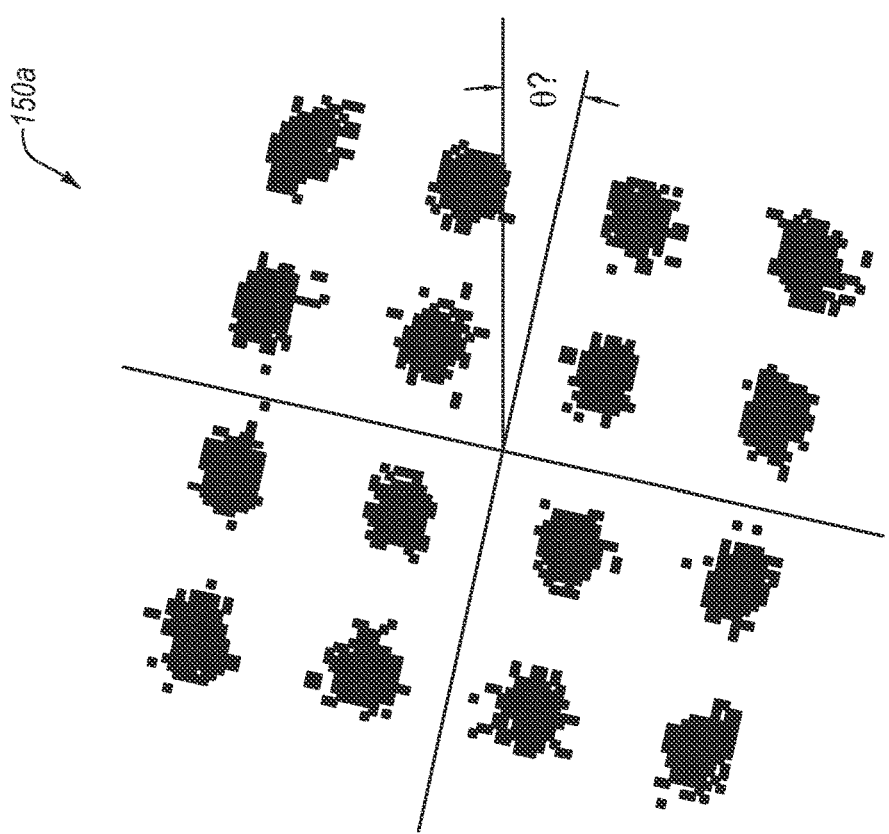
FIG. 1B illustrates example symbol constellations corresponding to an optical signal.
Figure 1B:
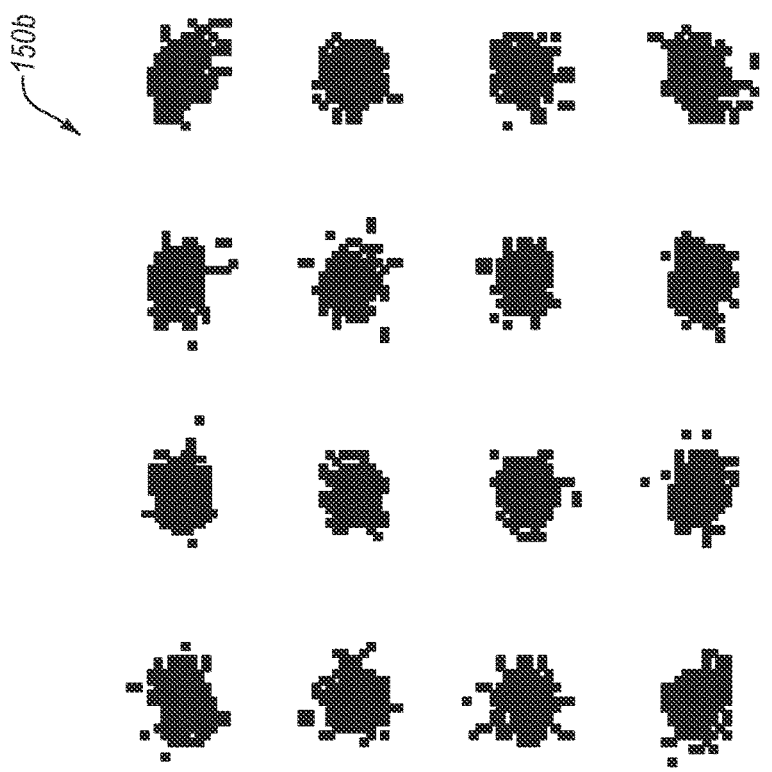

Additionally or alternatively, the data signal 102 may have had carrier phase recovery performed thereon. The carrier phase recovery may account for rotation of the corresponding optical signal as it propagates through the optical link. For example, in embodiments, the data signal 102 may be represented using a constellation of the symbols of the data signal 102. Additionally, FIG. 1B illustrates an example constellation 150a corresponding to the data signal 102 prior to carrier phase recovery being performed. As illustrated in FIG. 1B, the constellation 150a may be rotated by an angle "θ." Further, FIG. 1B illustrates an example constellation 150b in which the rotation has been removed through carrier phase recovery.

Returning to FIG. 1A, the link properties 104 may include properties about an optical link over which the received optical signal may propagate. For example, the link properties 104 may include a distance between an optical transmitter that communicated the received optical signal and the optical receiver. Additionally or alternatively, the optical link may include an optical fiber and/or one or more other optical components such as an optical amplifier. In these and other embodiments, the link properties 104 may include information about the optical link that may affect the power profile of signals propagating through the optical link. Such information may include the physical properties of the optical link such as the materials of corresponding optical components (e.g., of optical fiber included in the link), the doping of the optical components, the length of the link, the sizes of corresponding optical fibers, etc. Additionally or alternatively, the link properties 104 may include information related to chromatic dispersion that may be caused by the optical link, etc.

Figure 1C:
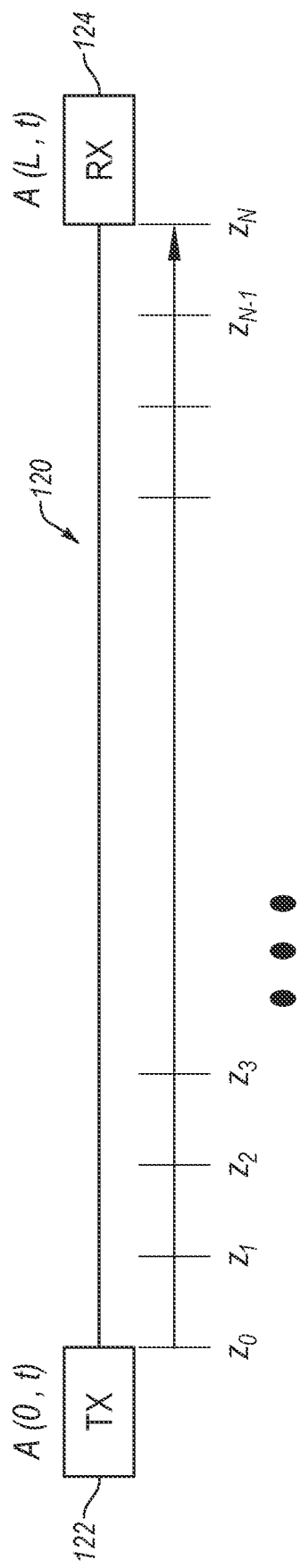
FIG. 1C illustrates an example optical link between an optical transmitter and an optical receiver.

In some embodiments, the link properties 104 may include information that respectively corresponds to multiple sections of the optical link. For example, FIG. 1C illustrates an example optical link 120 between an optical transmitter 122 and an optical receiver 124. The optical link 120 may be a nonlinear optical fiber having length "L". Further, the optical link 120 may be divided into "N+1" equal segments that are of length "z" starting at "$z_0$" and ending at "$z_N$". By way of example, the link properties 104 may include respective information about each increment of the optical link 120.

In some embodiments, the PPE module 100 may be implemented using hardware including one or more processors, central processing units (CPUs) graphics processing units (GPUs), data processing units (DPUs), parallel processing units (PPUs), microprocessors (e.g., to perform or control performance of one or more operations), programmable vision accelerators (PVAs)—which may include one or more direct memory access (DMA) systems and/or one or more vector or vision processing units (VPUs), field-programmable gate arrays (FPGA), application-specific integrated circuits (ASICs), accelerators (e.g., deep learning accelerators (DLAs)), and/or other processor types. In some other instances, one or more of these modules may be implemented using a combination of hardware and software.

In the present disclosure, operations described as being performed by the PPE module 100 may include operations that the PPE module 100 may direct one or more corresponding computing systems to perform. In these or other embodiments, the PPE module 100 may be implemented by one or more computing systems, such as that described in further detail with respect to FIG. 2. Additionally or alternatively, the one or more computing systems on which the PPE module 100 may be deployed may include a digital signal processing system included in an optical receiver.

In some embodiments, the PPE module 100 may be configured to obtain a first waveform profile corresponding to the optical signal associated with the data signal 102. In some embodiments, the PPE module 100 may be configured to reconstruct the waveform of the received signal to generate the first waveform profile such that the first waveform profile represents the optical waveform of the optical signal received at the optical receiver. The first waveform profile may also be referred to as a reference waveform profile used in PPE based on the first waveform profile being based on the received optical signal.

For example, in some embodiments, upsampling of the data signal 102 may be performed to better represent the received optical signal. For instance, the data signal 102 may include data that is sampled from the optical signal by the optical receiver. In these and other embodiments, the sampling rate may be such that a certain number of samples may be obtained for each respective symbol included in the optical signal. In instances in which the data signal 102 corresponds to less than a threshold number of samples per symbol (e.g., less than two samples), upsampling may be performed to have more samples per symbol and accordingly a better representation of the optical signal. The upsampling may be performed using any suitable technique. For example, in some embodiments, the upsampling may be based on pulse shaping and/or zero padding.

Additionally or alternatively, as indicated above, the data signal 102 may have had chromatic dispersion removed therefrom. In some embodiments, the generation of the first waveform profile may accordingly include performing reverse chromatic dispersion compensation with respect to the data signal 102 to reintroduce the effects of the chromatic dispersion such that the data signal 102 now better represents the optical signal as received.

Note that some operations to better represent the optical signal may be difficult to perform or unable to be performed. For example, it may be difficult to determine the actual amount of rotation compensation that may be performed during the carrier phase recovery. As such, it may be difficult to reverse the rotation compensation in the generation of the first waveform profile. In the present disclosure, such rotation compensation is not performed in the generation of the first waveform profile. However, as explained in detail below, the rotation is accounted for using a complex scaler in other parts of the determination of the PPE 106.

In some embodiments, the first waveform profile may be represented using a mathematical expression. For example, referring to the example of FIG. 1C, "A(L, t)" may be an expression for the first waveform profile that represents the optical signal at the receiver 124 at a time "t" after propagating over the length "L" of the optical link 120 from the transmitter 122 to the receiver 124. Note that in the present disclosure and use of the term "A(L, t)" may also represent the optical signal having the nonlinear rotation removed therefrom.

In these and other embodiments, the PPE module 100 may be configured to obtain a second waveform profile that is an estimate of the first waveform profile. In particular, the second waveform profile may be an emulated waveform that is generated based on the link properties 104 and the data signal 102. For example, based on data included in the data signal 102, the PPE module 100 may be configured to perform a reconstruction of the optical waveform of the optical signal as transmitted at the transmitter using any suitable technique. For example, the transmitted waveform may be reconstructed based on known characteristics of the optical transmitter (such as pulse shaping, modulation format, frequency response of electrical drivers and optical modulators).

In these and other embodiments, the PPE module 100 may be configured to use the link properties 104 to determine the effects of the optical link on the optical signal and corresponding waveform as the optical signal propagates from the optical transmitter to the optical receiver. In some embodiments, the resulting waveform from applying the effects of the optical link on the reconstructed transmitted signal may be the emulated waveform that may be used as the second waveform profile.

In these and other embodiments, the powers of the first waveform profile and the second waveform profile may be normalized with respect to each other as part of the generation of the first waveform profile and of the second waveform profile. The normalizing may be performed using any suitable technique. Additionally or alternatively, in some instances, the characteristics of the optical transmitter that are used to reconstruct the transmitted signal, from which the second waveform profile is based, may not be characterized exactly. As such, in some embodiments, there may be a normalization error (e.g., a scaling error) between the first waveform profile and the second waveform profile.

In these and other embodiments, mathematical expressions may be used to represent the effects on the optical signal as it propagates through the optical link. Additionally or alternatively, mathematical expressions may be used to represent the effects caused within each discrete segment of the optical link. In these and other embodiments, the mathematical expressions may be applied to a mathematical representation of the transmitted optical signal. A combination of the mathematical expressions may be used to generate a mathematical equation that represents the second waveform profile.

For example, referring back to the example of FIG. 1C, in some embodiments, the second waveform profile may be represented by an expression (1) that is based on a split-step Fourier method as follows:

$$E(L, t) = \hat{N}(z_N, z_{N-1})\hat{H}(z_N - z_{N-1}) \quad (1)$$
$$\hat{N}(z_{N-1}, z_{N-2})\hat{H}(z_{N-1} - z_{N-2}) \ldots \hat{N}(z_1, z_0)\hat{H}(z_1 - z_0)A(0, t)$$

In expression (1), the reconstructed optical signal as transmitted at the optical transmitter 122 is represented by the expression "A(0, t)", which may represent the optical signal at segment "$z_0$" with respect to a sample taken at a time "t". Further, the expression "E(L, t)" represents the emulated version of the optical signal at the receiver 124 after propagating over the length "L" of the optical link 120 from the transmitter 122 to the receiver 124. As such, "E(L, t)" may be an approximation of "A(L, t)" (e.g., A(L, t)≈E(L, t)).

Further, chromatic dispersion for the propagation over a distance "z" is represented in expression (1) using a linear operator "$\hat{H}(z)$." In addition, "$\hat{N}(z_{k+1}, z_k)$" is a nonlinear operator describing propagation of light for respective segments between $z_k$ and $z_{k+1}$, in which "$\hat{N}(z_{k+1}, z_k)$" may also represent an emulation of rotation of the optical signal through the optical link 120.

Further, "$\hat{N}(z_{k+1}, z_k)$" may represent the following expression (2):

$$\hat{N}(z_{k+1}, z_k) = \exp[-j\gamma'_k \|\cdot\|^2 \Delta z_k] \quad (2)$$

With respect to expression (2), "j" is an imaginary number; "$\Delta z_k = x_{k+1} - z_k$"; and "$\gamma'_k = -\gamma_{nl} \exp[\int_0^{z_k} \alpha(z) dz]$" in which "$\alpha(z)$" is attenuation in the optical link 120 such that "$\gamma'_k$" is proportional to a nonlinear coefficient "$(\gamma_{nl})$" and optical power at "$z_k$."

In addition, when using a small "$\Delta z_k$" such that "$\gamma'_k \|\cdot\|^2 \Delta z_k \ll 1$", then expression (2) may be approximated using an expression (3) as follows:

$$\hat{N}(z_{k+1}, z_k) \approx 1 - j\gamma'_k \|\cdot\|^2 \Delta z_k = 1 - j\gamma'_k \hat{N}' \Delta z_k, \text{ where } \hat{N}' = \|\cdot\|^2 \quad (3)$$

Based on substitutions of expression (3), expression (1) may be rewritten using an expression (4) as follows:

$$E(L, T) = \left(1 - j\gamma'_{N-1}\hat{N}'\Delta z_{N-1}\right)\hat{H}(z_N - z_{N-1})\left(1 - j\gamma'_{N-2}\hat{N}'\Delta z_{N-2}\right) \quad (4)$$

$$\hat{H}(z_{N-1} - z_{N-2}) \ldots \left(1 - j\gamma'_0 \hat{N}' \Delta z_0\right)\hat{H}(z_1 - z_0)A(0, t)$$

Further, expression (4) may be modified by ignoring higher order terms (e.g., $\Delta z_N^2$, $\Delta_N^3$, ...) to obtain an expression (5) as follows:

$$E(L, t) = \quad (5)$$

$$\left\{\hat{H}(L) - \hat{H}(L - z_1)j\gamma'_1\hat{N}'\Delta z_N\hat{H}(z_1) - \hat{H}(L - z_2)j\gamma'_2\hat{N}'\Delta z_2\hat{H}(z_1) - \right.$$

$$\left. \ldots - \hat{H}(L - z_{N-1})j\gamma'_{N-1}\hat{N}'\Delta z_{N-1}\hat{H}(z_{N-1})\right\}A(0, t);$$

Where $\hat{H}(L - z_k) = \hat{H}(z_N - z_{N-1})\hat{H}(z_{N-1} - z_{N-2}) \ldots \hat{H}(z_{k+1} - z_k)$ Further, in some instances, expression (5) may be rewritten into an expression (6) as follows:

$$\left(E(L, m) = \right. \quad (6)$$

$$\hat{H}(L)A(0, , m) - \sum_{k=0}^{N-1} j\gamma'_k \Delta z_k \left\{\hat{H}(L - z_k)\left[\hat{N}'\left(\hat{H}(z_k)A(0, m)\right)\right]\right\}$$

Note that the denotation of "t" has been changed to "m" in expression (6) in which "m=0, ..., M", which is used to denote the number of samples at times "t" that are obtained over a discrete time sequence. Further, "E(L, m)" may be an approximation of "A(L, m)", which may represent the first waveform profile corresponding to the optical signal as received.

However, as noted above, "A(L, m)" may have nonlinear rotation removed therefrom, whereas "E(L, m)" may emulate the nonlinear rotation through the inclusion of "$\hat{N}'$" in expression (6). Further, a scaling error between "A(L, m)" and "E(L, m)" may be present such as described above. As such, "E(L, m)" may differ from "A(L, m)" by a scaling error of "ρ" and an unknown nonlinear rotation of "θ." In these and other embodiments, an unknown complex scaling factor of "$\rho e^{j\theta}$" may accordingly be added to expression (6) to obtain expression (7) as follows below.

$$E(L, m) = \quad (7)$$

$$\rho e^{j\theta}\left[\hat{H}(L)A(0, m) - \sum_{k=0}^{N-1} j\gamma'_k \Delta z_k \left\{\hat{H}(L - z_k)\left[\hat{N}'\left(\hat{H}(z_k)A(0, m)\right)\right]\right\}\right]$$

Therefore, expression 7 may be used as the second waveform profile in some embodiments. The PPE module 100 may be configured to determine the PPE 106 of the optical link 120 based on a comparison between the first waveform profile, as represented by "A(L, m)" and the second waveform profile, as represented by "E(L, m)".

For example, based on expression (7) and the emulation of "A(L,m)" by "E(L, m)", expression (8) below may be obtained:

$$A(L, m) \approx \quad (8)$$

$$\rho e^{j\theta}\left[\hat{H}(L)A(0, m) - \sum_{k=0}^{N-1} j\gamma'_k \Delta z_k \left\{\hat{H}(L - z_k)\left[\hat{N}'\left(\hat{H}(z_k)A(0, m)\right)\right]\right\}\right]$$

Further, expression (8) may be rewritten into expression (9) as follows:

$$A(L, m) \approx \quad (9)$$

$$\rho e^{j\theta}\hat{H}(L)A(0, m) - \rho e^{j\theta}\sum_{k=0}^{N-1} j\gamma'_k \Delta z_k \left\{\hat{H}(L - z_k)\left[\hat{N}'\left(\hat{H}(z_k)A(0, m)\right)\right]\right\}$$

Further, expression (9) may be simplified by using expression (10), as follows below, combined with expression (9) to obtain expression (11), as follows below:

$$g[z_k, m] = -j\Delta z_k \left\{\hat{H}(L - z_k)\left[\hat{N}'\left(\hat{H}(z_k)A(0, m)\right)\right]\right\}, \quad (10)$$

where $m = 0, \ldots, M$ and $k = 0, 1, \ldots, N - 1$ $$A(L, m) \approx \rho e^{j\theta}\hat{H}(L)A(0, m) + \rho e^{j\theta}\sum_{k=0}^{N-1} \gamma'_k g[z_k, m] \quad (11)$$

In some embodiments, the comparison between the first waveform profile and the second waveform profile may include determining a value for $\gamma_k$ that may minimize a difference between the first waveform profile (e.g., as represented by "A(L, m)" on the left side of expression (11)) and between the second waveform profile (e.g., as represented on the right side of expression (11)). In these and other embodiments, the difference may include a mean square error between both sides.

For example, a cost function "I" of a mean square error between both sides of expression (11) may be defined as follows in expression (12):

$$I \approx E\left[\|A_1 - G\gamma''\|^2\right] \quad (12)$$

In expression (12) "E" may represent the error, $(A)_m = A(L, m)$; $(G)_{mk} = g[z_k, m]$ for $k < N$; $(G)_{mN} = \hat{H}(L)A(0, m)$, $k = 1, 2, \ldots, N$; and $\gamma'' = \rho e^{j\theta}[\gamma'_0, \gamma'_1, \gamma'_{N-1}, 1]T$, such that $\gamma''_N = \rho e^{j\theta}$.

Using any suitable technique, a value vector for $\gamma''$ may be found that minimizes I. For example, the value for $\gamma''$ that minimized "I" may be expressed as "$\widehat{\gamma''}$" and may be expressed as follows in expression (13):

$$\hat{\gamma}'' = [G^\dagger G]^{-1} G^\dagger A \quad (13)$$

Further, as noted above, the last element of the value vector for $\gamma''$("$\gamma''_N$") may be the complex scaling factor "$pe^{j\Theta}$" such that the complex scaling factor may be found. Further, as noted above with respect to expression (2), $\gamma''$ may be proportional to the optical power. As such, in some embodiments, the PPE 106 may be determined based on $\gamma''$. For example, in some embodiments, the PPE 106 of the optical link 120 may be expressed using expression (14) as follows:

$$PPE \propto \text{abs}[\gamma_0'', \gamma_1'', \ldots, \gamma_{N-1}'']/|\gamma_N''| \qquad (14)$$

Therefore, the determination of PPE 106 by the PPE module 100 may account for nonlinear rotation of the optical signal in a manner that allows for better solving for the nonlinear rotation. Additionally or alternatively, the determination of PPE as disclosed in the present disclosure may also better account for a scaling error that may occur between the first waveform profile and the second waveform profile. Such a technique may provide a better PPE than other techniques that either ignore nonlinear rotation and/or scaling errors or that attempt to estimate nonlinear rotation and/or scaling errors.

Further, the improved PPE 106 determination may help improve optical networks in general. For example, one or more components of the optical link may be adjusted based on the PPE 106. For instance, the PPE 106 may indicate that a component may need to be replaced. Further, one or more properties of the transmitted optical signal may be adjusted based on the PPE 106 to help counteract adverse effects that may be experienced by the optical signal and that may be indicated by the PPE 106.

For example, PPE may be used to perform anomaly loss detection in the optical link. The detection of the anomaly loss may allow for the identification of portions of the optical link that may need replacement. Additionally or alternatively, the anomaly loss may be mitigated using any other suitable technique. For example, in optical links with hybrid Erbium-Doped Fiber Amplifier (EDFA) and Raman amplification, launch power or pump power may be adjusted depending on anomaly loss and location (e.g., as indicated based on PPE) to reoptimize transmission performance. Robust and accurate PPE may accordingly help simplify operations and troubleshooting of disaggregated optical networks.

Further, PPE determinations may be used for compensation of nonlinear interference noise in advanced coherent receivers. For instance, for better compensation, an accurate power profile along the transmission link is very helpful such that PPE determined according to the present disclosure may also help with such compensation.

Modifications, additions, or omissions may be made to FIGS. 1A, 1B and 1C without departing from the scope of the present disclosure. For example, the specific properties and/or operations described may vary.

Figure 2:
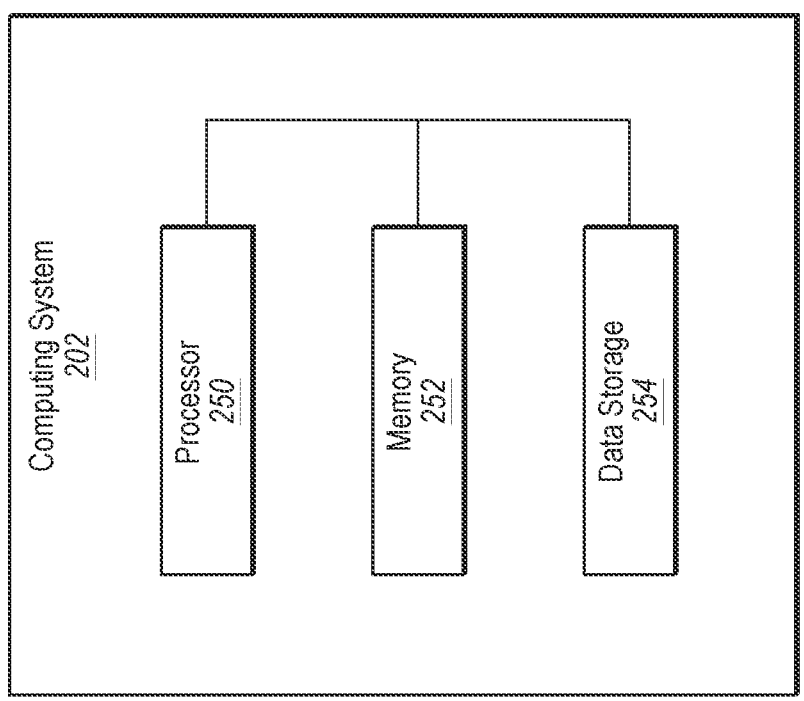
FIG. 2 illustrates a block diagram of an example computing system that may be used to determine a power profile estimation.

FIG. 2 illustrates a block diagram of an example computing system 202 that may be used to determine PPE corresponding to optical links, according to at least one embodiment of the present disclosure. The computing system 202 may be configured to implement or direct one or more operations associated with the PPE module 100 of FIG. 1A, in some embodiments. Additionally or alternatively, the computing system 202 may be implemented in an optical receiver, such as the optical receiver 124 of FIG. 1C.

The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, a PPE module (e.g., the PPE module 100 of FIG. 1A) may be included in the data storage 254 as program instructions. The processor 250 may fetch the program instructions of the PPE module from the data storage 254 and may load the program instructions of the PPE module in the memory 252. After the program instructions of the PPE module are loaded into memory 252, the processor 250 may execute the program instructions such that the computing system 202 may implement the operations (e.g., perform the operations and/or cause performance of the operations) associated with the PPE module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
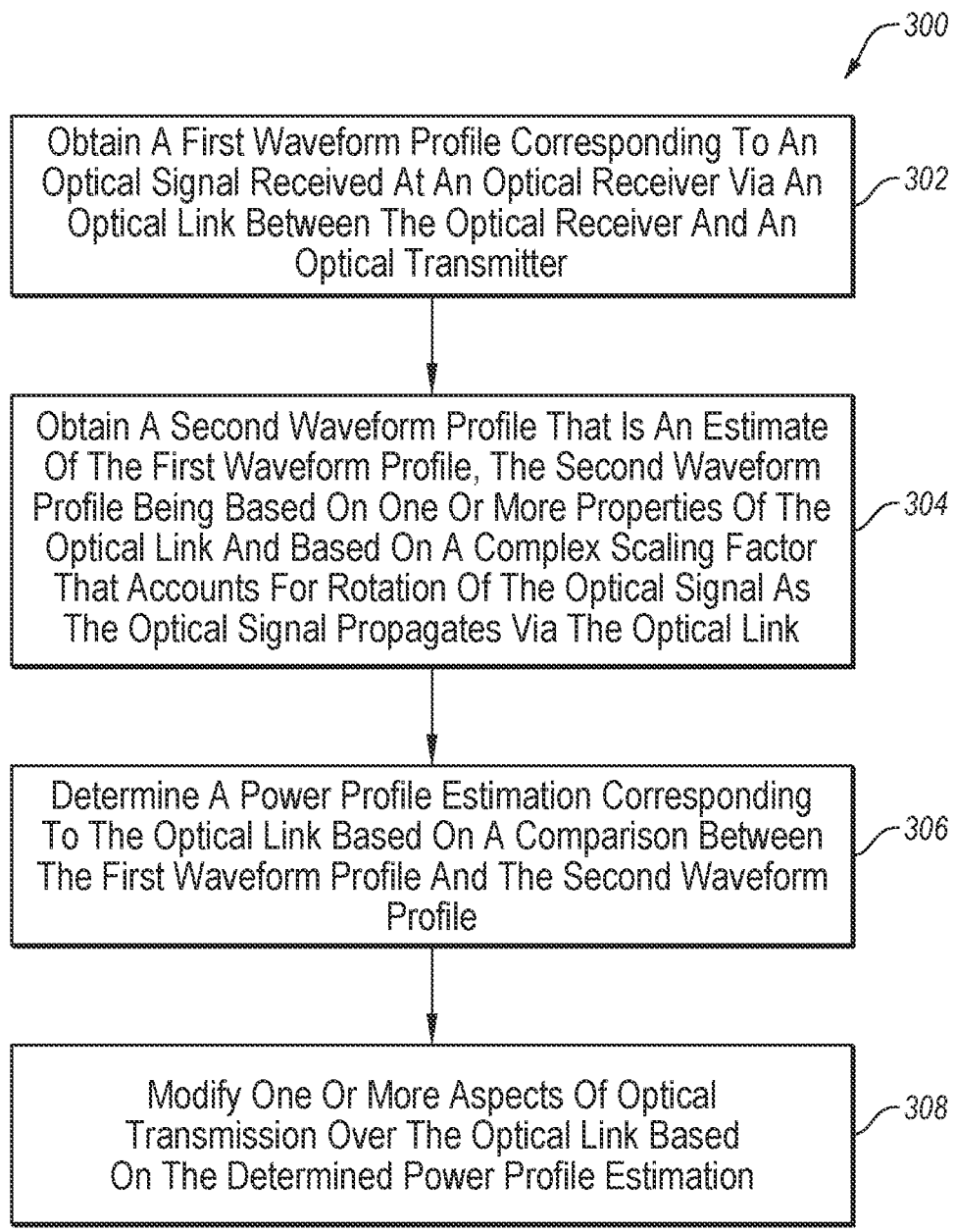
FIG. 3 is a flowchart of an example method of determining an power profile estimation.

FIG. 3 is a flowchart of an example method 300 of determining PPE corresponding to an optical link, according to at least one embodiment described in the present disclosure. The method 300 may be performed by any suitable system, apparatus, or device. By way of example, the PPE module 100 of FIG. 1A, or the computing system 202 of FIG. 2 (e.g., as directed by the PPE module 100 in some embodiments) may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

At block 302, a first waveform profile corresponding to an optical signal received at an optical receiver via an optical link between the optical receiver and an optical transmitter may be obtained. In some embodiments, the first waveform profile described with respect to FIGS. 1A-1C may be an example of the first waveform profile obtained at block 302. Further, the obtaining of the first waveform profile may include one or more operations described with respect to FIGS. 1A-1C.

At block 304, a second waveform profile may be obtained. The second waveform profile may be an estimate of the first waveform profile. The second waveform profile may be based on one or more properties of the optical link, such as described above with respect to FIGS. 1A-1C. Additionally or alternatively, the second waveform profile may be based on a complex scaling factor that accounts for rotation of the optical signal as the optical signal propagates via the optical link, such as also described above with respect to FIGS. 1A-1C. In these and other embodiments, the complex scaling factor may account for one or more scaling errors between the second waveform profile and the first waveform profile.

At block 306, in some embodiments, a power profile estimation (PPE) corresponding to the optical link may be determined. In some embodiments, the PPE may be determined based on a comparison between the first waveform profile and the second waveform profile. In these and other embodiments, the PPE may be determined such as described above with respect to FIGS. 1A-1C.

At block 308, one or more aspects of optical transmission over the optical link may be modified based on the determined PPE. For example, one or more properties of optical signals transmitted over the optical link may be adjusted. Additionally or alternatively, one or more components included in the optical link may be modified, replaced, upgraded, etc. based on the determined PPE.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 300 may include additional blocks or fewer blocks.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 or data storage 254 of FIG. 2) for carrying or having computer-executable instructions or data structures stored thereon.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
obtaining a first waveform profile corresponding to an optical signal received at an optical receiver via an optical link between the optical receiver and an optical transmitter;

obtaining a second waveform profile that is an estimate of the first waveform profile, the obtaining of the second waveform profile including:
  determining chromatic dispersion corresponding to the optical link,
  determining a complex scaling factor that accounts for rotation of the optical signal as the optical signal propagates via the optical link, and
  applying the chromatic dispersion and the complex scaling factor to a representation of the optical signal as transmitted at the optical transmitter;
determining a power profile estimation corresponding to the optical link based on a difference between the first waveform profile and the second waveform profile; and
modifying one or more aspects of optical transmission over the optical link based on the determined power profile estimation.

2. The method of claim 1, wherein the first waveform profile is obtained based on data sampled by the optical receiver.

3. The method of claim 2, further comprising performing upsampling with respect to the sampled data in response to a number of samples per symbol of data being less than a threshold number.

4. The method of claim 2, wherein the obtaining of the first waveform profile includes adding chromatic dispersion corresponding to the optical link to the sampled data, in which the chromatic dispersion was previously removed from the sampled data.

5. The method of claim 1, wherein the determining of the power profile estimation corresponding to the optical link is based on minimizing the difference between the first waveform profile and the second waveform profile.

6. The method of claim 1, wherein the difference is expressed using a mean square error between the first waveform profile and the second waveform profile.

7. The method of claim 1, wherein the complex scaling factor accounts for one or more scaling errors between the second waveform profile and the first waveform profile.

8. A computing system comprising:
one or more processors; and
one or more non-transitory computer-readable storage media configured to store instructions that, in response to being executed by the one or more processors, cause the system to perform operations, the operations comprising:
  obtaining a first waveform profile corresponding to an optical signal received at an optical receiver via an optical link between the optical receiver and an optical transmitter;
  obtaining a second waveform profile that is an estimate of the first waveform profile, the obtaining of the second waveform profile including:
    determining chromatic dispersion corresponding to the optical link,
    determining a complex scaling factor that accounts for rotation of the optical signal as the optical signal propagates via the optical link, and
    applying the chromatic dispersion and the complex scaling factor to a representation of the optical signal as transmitted at the optical transmitter; and
  determining a power profile estimation corresponding to the optical link based on a difference between the first waveform profile and the second waveform profile.

9. The system of claim 8, wherein the first waveform profile is obtained based on data sampled by the optical receiver.

10. The system of claim 9, the operations further comprising performing upsampling with respect to the sampled data in response to a number of samples per symbol of data being less than a threshold number.

11. The system of claim 9, wherein the obtaining of the first waveform profile includes adding the chromatic dispersion corresponding to the optical link to the sampled data, in which the chromatic dispersion was previously removed from the sampled data.

12. The system of claim 8, wherein the determining of the power profile estimation corresponding to the optical link is based on minimizing the difference between the first waveform profile and the second waveform profile.

13. The system of claim 8, wherein the difference is expressed using a mean square error between the first waveform profile and the second waveform profile.

14. The system of claim 8, wherein the complex scaling factor accounts for one or more scaling errors between the second waveform profile and the first waveform profile.

15. One or more non-transitory computer-readable storage media configured to store instructions that, in response to being executed, cause a system to perform operations, the operations comprising:
  obtaining a first waveform profile corresponding to an optical signal received at an optical receiver via an optical link between the optical receiver and an optical transmitter;
  obtaining a first waveform profile corresponding to an optical signal received at an optical receiver via an optical link between the optical receiver and an optical transmitter;
  obtaining a second waveform profile that is an estimate of the first waveform profile, the obtaining of the second waveform profile including:
    determining chromatic dispersion corresponding to the optical link,
    determining a complex scaling factor that accounts for rotation of the optical signal as the optical signal propagates via the optical link, and
    applying the chromatic dispersion and the complex scaling factor to a representation of the optical signal as transmitted at the optical transmitter; and
  determining a power profile estimation corresponding to the optical link based on a difference between the first waveform profile and the second waveform profile.

16. The one or more non-transitory computer-readable storage media of claim 15, wherein the first waveform profile is obtained based on data sampled by the optical receiver.

17. The one or more non-transitory computer-readable storage media of claim 16, the operations further comprising performing upsampling with respect to the sampled data in response to a number of samples per symbol of data being less than a threshold number.

18. The one or more non-transitory computer-readable storage media of claim 16, wherein the obtaining of the first waveform profile includes adding chromatic dispersion corresponding to the optical link to the sampled data, in which the chromatic dispersion was previously removed from the sampled data.

19. The one or more non-transitory computer-readable storage media of claim 15, wherein the determining of the power profile estimation corresponding to the optical link is based on minimizing the difference between the first waveform profile and the second waveform profile.

20. The one or more non-transitory computer-readable storage media of claim 15, wherein the difference is expressed using a mean square error between the first waveform profile and the second waveform profile.

\* \* \* \* \*